United States Patent Office 3,597,363
Patented Aug. 3, 1971

3,597,363
MODIFIED URANIUM ACTIVATED BARIUM PYROPHOSPHATE PHOSPHORS
Frank J. Avella, Flushing, N.Y., assignor to General Telephone & Electronics Laboratories Incorporated
No Drawing. Continuation-in-part of application Ser. No. 683,478, Nov. 16, 1967. This application Apr. 7, 1969, Ser. No. 814,171
Int. Cl. C09k 1/30
U.S. Cl. 252—301.1        11 Claims

ABSTRACT OF THE DISCLOSURE

Uranium activated barium pyrophosphate phosphors are disclosed in which magnesium, cadmium, calcium, strontium or zinc are substituted for part of the barium. These phosphors emit green light when excited by ultraviolet radiation, X-rays, cathode rays or ion bombardment and may be used for color correction in low, medium and high pressure mercury discharge lamps, in cathode ray tube screens and in devices for detecting and measuring the intensity of ion and X-ray radiation.

CROSS-REFERENCE TO RELATED APPLICATION

This application is a continuation-in-part of U.S. Pat. application Ser. No. 683,478 filed Nov. 16, 1967.

BACKGROUND OF THE INVENTION

This invention relates to fluorescent materials which emit green light when exposed to ultraviolet radiation, X-rays, cathode rays and ion bombardment. In particular, it relates to uranium activated barium pyrophosphate phosphors in which magnesium, cadmium, calcium, strontium or zinc has been substituted for part of the barium.

Barium pyrophosphate is known as a host for manganese, tin, lead, titanium and uranium. It is also known that uranium may be used as an activator to obtain green emission from barium halophosphate and from barium magnesium orthophosphate hosts. I have discovered that excellent green luminescence may be obtained from modified uranium activated barium pyrophosphate phosphors.

SUMMARY OF THE INVENTION

My invention relates to a family of uranium activated barium pyrophosphate phosphors having the general formula $(2-x)BaO \cdot xMO \cdot P_2O_5:yUO_3$, where M is Mg, Cd, Ca, Sr or Zn, $x$ has a value in the range 0.02 to about 1.0, and $y$ has a value which produces green fluorescence when the composition is excited by ultraviolet radiation, X-rays, cathode rays or ion bombardment. More specifically, a value of $y$ in the approximate range 0.02 to 1.00 gram-atom per mole of the host material $(2-x)BaO \cdot xMO \cdot P_2O_5$ results in green luminescence under these excitation conditions.

It is believed that the actual luminescence centers in the described compositions consist of hexavalent uranium ions coordinated by several oxygen ions in the host matrix. The luminescence from these uranium-oxygen centers is similar to that attributed to electronic transitions within the molecular uranyl ion, $UO_2^{2+}$. Thus, while the subject phosphors are believed best defined as uranium activated, they may also be considered as uranyl activated.

Uranium activated barium pyrophosphate has a broad excitation band extending throughout the ultraviolet region. Its emission occurs as a spectral band extending approximately from 500 to 600 nanometers with a peak near 540 nanometers. Luminescence is obtained for uranium concentrations in the range 0.02 to 1.00 gram-atom per mole of $2BaO \cdot P_2O_5$ with an optimum concentration between 0.20 and 0.60 gram-atom per mole of host.

Although barium pyrophosphate is an excellent host for uranium, I have found that the pyrophosphates of magnesium, cadmium, calcium, strontium and zinc are poor hosts producing uranium emission which is either undetectable or quite feeble under all forms of excitation. However, when small amounts of these elements are substituted for portions of barium in barium pyrophosphate, an effective host for uranium activation is produced. In fact, under certain conditions of excitation to be shown in the following examples, these substituted pyrophosphates produce greater lumen output than the unsubstituted $2BaO \cdot P_2O_5:UO_3$.

Substituted phosphors have been prepared having the general formula $(2-x)BaO \cdot xMO \cdot P_2O_5:yUO_3$ where the values of $x$ and $y$ have the following ranges:

M=Mg: $x=0.02$–$0.30$, $y=0.02$–$1.00$
M=Cd: $x=0.10$–$1.0$, $y=0.02$–$1.00$
M=Ca: $x=0.10$–$0.30$, $y=0.02$–$1.00$
M=Sr: $x=0.10$–$0.30$, $y=0.02$–$1.00$
M=Zn: $x=0.10$–$1.0$, $y=0.02$–$1.00$

When M is Mg, Ca, Sr, or Zn, the quantities of starting materials required to produce the desired formulation are normally stoichiometric. When M is Cd, an excess of CdO is normally employed to compensate for loss of Cd through evaporation at elevated temperatures. The following concentrations have been found to result in optimized photoluminescence:

M=Mg: $x=0.10$, $y=0.40$
M=Cd: $x=0.50$ (+0.065 excess), $y=0.20$
M=Ca: $x=0.1$, $y=0.2$
M=Sr: $x=0.1$, $y=0.2$
M=Zn: $x=0.1$, $y=0.2$ The excitation and emission characteristics of the cadmium substituted phosphors are similar to those of the unsubstituted $2BaO \cdot P_2O_5:UO_3$. The emission spectrum of the cadmium substituted phosphor consists of a band peaking near 540 nanometers with a half-width of about 40 nanometers. In the magnesium substituted materials, the emission spectrum peaks near 520 nanometers with a half width of about 45 nanometers.

Uranium activated barium pyrophosphate may be prepared by blending dibasic barium orthophosphate $BaHPO_4$ with a uranyl compound such as $$UO_2(NO_3)_2 \cdot 6H_2O$$

and firing the blend at approximately 400° C. to 500° C. for 1 to 2 hours. The charge is then cooled to room temperature, mortared and re-fired at approximately 1200° C. for 1 hour. The resulting phosphor is a yellowish green powder.

Uranium activated magnesium or cadmium substituted barium pyrophosphates may be prepared by blending $BaHPO_4$ with a dibasic Mg or Cd phosphate and a uranyl compound such as $UO_2(NO_3) \cdot 6H_2O$ or $UO_3$. Alternately, the Mg or Cd phosphate may be replaced by a source of phosphorus plus MgO or CdO or compounds decomposing to MgO or CdO at elevated temperatures. Suitable compounds of this latter type are $MgNH_4PO_4$ or CdO plus $(NH_4)_2HPO_4$. After mixing, the components may be fired in one or more steps up to a maximum of about 1200° C. for M=Mg and about 1000° C. for M=Cd. In most cases, the firing schedule is begun at room temperature with from ½ to 2 hours being allowed for the blend to reach the initial firing temperature thereby avoiding violent decomposition of the starting materials. The length of the firing step at any temperature is usually between ¾ and 2¾ hours with mortaring between firings.

As shall be described hereinafter, uranium activated barium pyrophosphate phosphors in which calcium, strontium or zinc substituted for part of the barium may be prepared in a similar manner.

DESCRIPTION OF THE PREFERRED EMBODIMENT

EXAMPLE I 4.75 grams of dibasic barium orthophosphate $BaHPO_4$, 0.147 gram $MgNH_4PO_4$ and 2.16 grams $$UO_2(NO_3)_2 \cdot 6H_2O$$

were dry-blended and fired in air in a fused silica crucible at a temperature of 500° C. for one hour. The material was then cooled to room temperature, mortared and refired at 1200° C. for one hour. After cooling, the phosphor was excited by a low pressure mercury vapor lamp having its greatest energy output at a wavelength of 253.7 nanometers. The phosphor was also excited by a medium pressure mercury vapor lamp having its peak emission in the group of spectral lines near 365 nanometers. In each case, the exciting radiation was passed through a Corning 7–54 filter to remove the visible component. Using an optimized sample of uranium activated barium pyrophosphate $2BaO \cdot P_2O_5:0.2UO_3$ as a standard it was found that the relative luminosity of the prepared magnesium substituted uranium activated barium pyrophosphate $1.9BaO \cdot 0.1MgO \cdot P_2O_5:0.4UO_3$ was 147% that of $2BaO \cdot P_2O_5:0.2UO_3$ when excited by radiation from a low pressure mercury lamp and 130% when excited by a medium pressure mercury lamp.

The relative luminosity of another sample $$1.95BaO \cdot 0.05MgO \cdot P_2O_5:0.2UO_3$$

was also measured and found to be 114% of the $$2BaO \cdot P_2O_5:0.2UO_3$$

sample under the low pressure mercury vapor lamp and 105% under the high pressure lamp.

EXAMPLE II

A number of additional samples of uranium activated magnesium substituted barium pyrophosphate phosphors $(2-x)BaO \cdot xMgO \cdot P_2O_5:yUO_3$ were prepared by the method of Example I and found to exhibit similar characteristics. The blends used in synthesizing these phosphors are given in Table I.

TABLE I $(2-x)BaO \cdot xMgO \cdot P_2O_5:yUO_3$

| | | Grams | | |
|---|---|---|---|---|
| x | y | BaHPO₄ | MgNH₄PO₄ | UO₂(NO₃)₂·6H₂O |
| 0.10 | 0.02 | 4.75 | 0.147 | 0.108 |
| 0.02 | 0.20 | 4.95 | 0.0295 | 1.08 |
| 0.05 | 0.20 | 4.88 | 0.0737 | 1.08 |
| 0.10 | 0.20 | 4.75 | 0.147 | 1.08 |
| 0.15 | 0.20 | 4.63 | 0.221 | 1.08 |
| 0.10 | 0.30 | 4.75 | 0.147 | 1.62 |
| 0.10 | 0.40 | 4.75 | 0.147 | 2.16 |
| 0.10 | 0.10 | 4.75 | 0.147 | 0.540 |
| 0.30 | 0.20 | 4.25 | 0.442 | 1.08 |
| 0.10 | 1.00 | 4.75 | 0.147 | 5.40 |

EXAMPLE III 3.75 grams $BaHPO_4$, 0.779 gram CdO, 0.708 gram $(NH_4)_2HPO_4$ and 1.08 grams $UO_2(NO_3)_2 \cdot 6H_2O$ were dry-blended and then fired in air in a fused silica crucible at a temperature of 500° C. for one hour. This blend included an excess of 13 mole percent CdO to compensate for loss of Cd through evaporation at elevated temperatures. The material was next cooled, mortared, fired a second time at a temperature of 800° C. for one hour. After cooling, it was again mortared, fired at 1000° C. for one hour and cooled. The resultant phosphor $$1.5BaO \cdot 0.5CdO \cdot P_2O_5:0.2UO_3$$

was compared to $2BaO \cdot P_2O_5:0.2UO_3$ under the same conditions as the magnesium substituted phosphor of Example II. It was found that the relative luminosity of $1.5BaO \cdot 0.5CdO \cdot P_2O_5:0.2UO_3$ was 140% that of $$2BaO \cdot P_2O_5:0.2UO_3$$

under low pressure mercury vapor lamp excitation and 117% under the medium pressure lamp.

A second sample of uranium activated cadmium substituted barium pyrophosphate $$1.5BaO \cdot 0.5CdO \cdot P_2O_5:0.3UO_3$$

was completed with $2BaO \cdot P_2O_5:0.2UO_3$. This sample exhibited a relative luminosity of 123% of the standard under the low pressure lamp and 105% of the standard when excited by the medium pressure lamp.

EXAMPLE IV

A number of additional samples of uranium activated cadmium substituted barium pyrophosphate phosphors $(2-x)BaO \cdot xCdO \cdot P_2O_5:yUO_3$ were prepared by the method of Example III. The blends used in synthesizing these phosphors are given in Table II.

TABLE II $(2-x)BaO \cdot xCdO \cdot P_2O_5:yUO_3$

| | | Grams | | |
|---|---|---|---|---|
| x | y | BaHPO₄ | CdO | (NH₄)₂HPO₄ | UO₂(NO₃)₂·6H₂O |
| 0.10 | 0.02 | 4.75 | ¹ 0.155 | 0.142 | 0.108 |
| 0.10 | 0.20 | 4.75 | ¹ 0.155 | 0.142 | 1.08 |
| 0.35 | 0.20 | 4.13 | ¹ 0.545 | 0.495 | 1.08 |
| 0.50 | 0.20 | 3.75 | 0.689 | 0.708 | 1.08 |
| 0.50 | 0.20 | 3.75 | ¹ 0.779 | 0.708 | 1.08 |
| 0.50 | 0.10 | 3.75 | ¹ 0.779 | 0.708 | 0.540 |
| 0.50 | 0.30 | 3.75 | ¹ 0.779 | 0.708 | 1.62 |
| 0.65 | 0.20 | 3.38 | ¹ 1.01 | 0.920 | 1.08 |
| 1.00 | 0.20 | 2.50 | ¹ 1.55 | 1.42 | 1.08 |
| 0.10 | 1.00 | 4.75 | 0.138 | 0.142 | 5.40 |

¹ Includes 13 mole percent excess CdO.

EXAMPLE V 4.75 grams $BaHPO_4$, 0.146 gram $CaHPO_4$ and 1.08 grams $UO_2(NO_3)_2 \cdot 6H_2O$ were dry-blended, put in a fused silica crucible at ambient temperature and then brought to a temperature of 500° C. The blend was held in the furnace at this temperature for one hour and then cooled to room temperature, mortared and re-fired at 1000° C. for one hour. After cooling and a second mortaring, the material was refired at 1200° C. for one hour. The resulting compound, $1.9BaO \cdot 0.1CaO \cdot P_2O_5:0.2UO_3$ was found to have a relative luminosity 109% of $$2BaO \cdot P_2O_5:0.2UO_3$$

when excited by a low pressure mercury vapor lamp and 113% of this standard under excitation by a medium pressure mercury vapor lamp.

A number of additional samples of uranium activated calcium substituted barium pyrophosphate phosphors $$(2-x)BaO \cdot xCaO \cdot P_2O_5:yUO_3$$

were prepared by the same method and exhibited similar properties. The blends used in synthesizing these phosphors are given in Table III.

TABLE III $(2-x)BaO \cdot xCaO \cdot P_2O_5:yUO_3$

| | | Grams | | |
|---|---|---|---|---|
| x | y | BaHPO₄ | CaHPO₄ | UO₂(NO₃)₂·6H₂O |
| 0.1 | 0.02 | 4.75 | 0.146 | 0.108 |
| 0.1 | 1.00 | 4.75 | 0.146 | 5.40 |
| 0.3 | 0.2 | 4.25 | 0.438 | 1.08 |
| 0.3 | 1.00 | 4.25 | 0.438 | 5.40 |

Example VI 4.75 grams $BaHPO_4$ and 0.197 gram $SrHPO_4$ and 1.08 grams $UO_2(NO_3)_2 \cdot 6H_2O$ were fired under the same conditions as described in Example V. The resulting phosphor $1.9 BaO \cdot 0.1 SrO \cdot P_2O_5 : 0.2 UO_3$ had a relative luminosity under low pressure mercury vapor lamp radiation which was 124% that of the standard $2BaO \cdot P_2O_5 : 0.2UO_3$ and 109% of the standard under medium pressure mercury lamp radiation.

Additional samples of uranium activated strontium substituted barium pyrophosphate phopshors $$(2-x)BaO \cdot xSrO \cdot P_2O_5 : yUO_3$$

were prepared by the same method and exhibited similar properties. The blends used in synthesizing these phosphors are given in Table IV.

TABLE IV
$(2-x)BaO \cdot xSrO \cdot P_2O_5 : yUO_3$

| | | Grams | | |
|---|---|---|---|---|
| $x$ | $y$ | $BaNPO_4$ | $SrHPO_4$ | $UO_2(NO_3)_2 \cdot 6H_2O$ |
| 0.1 | 0.02 | 4.75 | 0.197 | 0.108 |
| 0.1 | 1.00 | 4.75 | 0.197 | 5.40 |
| 0.3 | 0.2 | 4.25 | 0.591 | 1.08 |
| 0.3 | 1.00 | 4.25 | 0.591 | 5.47 |

Example VII 4.75 grams $BaHPO_4$, 0.0873 gram ZnO, 0.142 gram $(NH_4)_2HPO_4$ and 1.08 grams $UO_2(NO_3)_2 \cdot 6H_2O$ were dry-blended, put in a fused silica crucible at ambient temperature and brought to a temperature of 500° C. After holding in a furnace at this temperature for one hour, the blend was cooled to room temperature, mortared and refired at 800° C. for one hour. After cooling and a second mortaring, the material was refired at 1000° C. for one hour. The resulting compound $$1.9BaO \cdot 0.1ZnO \cdot P_2O_5 : 0.2UO_3$$

exhibited a relative luminosity 97% that of the standard $2BaO \cdot P_2O_5 : 0.2UO_3$ under low pressure mercury-vapor lamp excitation and 67% under the medium pressure lamp.

Another phosphor $1.5BaO \cdot 0.5ZnO \cdot P_2O_5 : 0.2UO_3$ was prepared in the same manner except that 3.75 grams $BaHPO_4$, 0.437 gram ZnO and 0.708 gram $(NH_4)_2HPO_4$ were used. This sample had a relative luminosity 92% of the standard under the low pressure lamp and 69% under the medium pressure lamp.

Still another phosphor $BaO \cdot ZnO \cdot P_2O_5 : 0.2UO_3$ was made by the same method except that 2.50 grams $BaHPO_4$, 0.873 gram ZnO and 1.42 grams $(NH_4)_2HPO_4$ were used in the blend. Luminosity under both low and medium pressure lamps were comparable to that obtained with the previously described uranium activated zinc substituted barium pyrophosphate phosphors.

In addition, the following samples of uranium activated zinc substituted barium pyrophosphate phosphors were prepared by the same method using the properties shown in Table IV. The luminescent properties were similar to those obtained with the previously described blends.

TABLE V
$(2-x)BaO \cdot xZnO \cdot P_2O_5 : yUO_3$

| | | Grams | | | |
|---|---|---|---|---|---|
| $x$ | $y$ | $BaHPO_4$ | ZnO | $(NH_4)_2HPO_4$ | $UO_2(NO_3)_2 \cdot 6H_2O$ |
| 0.1 | 0.02 | 4.75 | 0.0873 | 0.142 | 0.108 |
| 0.1 | 1.00 | 4.75 | 0.0873 | 0.142 | 5.40 |
| 0.3 | 1.00 | 4.25 | 0.262 | 0.426 | 5.40 |

As many changes could be made in the above described processes it is intended that all matter contained therein shall be interpreted as illustrative and not in a limiting sense.

What is claimed is:

1. A phosphor composition having the formula $$(2-x)BaO \cdot xMO \cdot P_2O_5 : yUO_3$$

where M is selected from the group consisting of Mg, Cd, Ca, Sr and Zn and $x$ and $y$ have values in the range 0.02 to about 1.0.

2. A phosphor composition is defined by claim 1 wherein M is Mg, $x$ has a value in the approximate range 0.02 to 0.30 and $y$ has a value in the approximate range 0.02 to 1.00.

3. A phosphor composition as defined by claim 3 wherein $x$ has a value of about 0.10 and $y$ has a value of about 0.40.

4. A phosphor composition as defined by claim 1 wherein M is Cd, $x$ has a value in the approximate range 0.1 to 1.0 and $y$ has a value in the approximate range 0.02 to 1.00.

5. A phosphor composition as defined by claim 4 wherein $x$ has a value of about 0.50 and $y$ has a value of about 0.20.

6. A phosphor composition as defined by claim 1 wherein M is Ca, $x$ has a value in the approximate range 0.10 to 0.30 and $y$ has a value in the approximate range 0.02 to 1.00.

7. A phosphor composition as defined by claim 6, wherein $x$ has a value of about 0.1 and $y$ has a value of about 0.2.

8. A phosphor composition as defined by claim 1 wherein M is Sr, $x$ has a value in the approximate range 0.10 to 0.30 and $y$ has a value in the approximate range 0.02 to 1.00.

9. A phosphor composition as defined by claim 8 wherein $x$ has a value of about 0.1 and $y$ has a value of about 0.2.

10. A phosphor composition as defined by claim 1 wherein M is Zn, $x$ has a value in the approximate range 0.10 to 0.30 and $y$ has a value in the approximate range 0.02 to 1.00.

11. A phosphor composition as defined by claim 10 wherein $x$ has a value of about 0.1 and $y$ has a value of about 0.2.

References Cited
UNITED STATES PATENTS

| | | | |
|---|---|---|---|
| 3,265,628 | 8/1966 | Vogel | 252—301.1 |
| 3,314,893 | 4/1967 | Hoffman | 252—301.1 |

CARL D. QUARFORTH, Primary Examiner

F. M. GITTES, Assistant Examiner

U.S. Cl. X.R.

23—346